TAMPERPROOF RECLOSABLE CARTON

Original Filed Feb. 25, 1964 8 Sheets-Sheet 1

TAMPERPROOF RECLOSABLE CARTON

Original Filed Feb. 25, 1964 8 Sheets-Sheet 2

TAMPERPROOF RECLOSABLE CARTON

Original Filed Feb. 25, 1964 8 Sheets-Sheet 3

TAMPERPROOF RECLOSABLE CARTON

Original Filed Feb. 25, 1964 8 Sheets-Sheet 5

United States Patent Office

Re. 26,471
Reissued Oct. 1, 1968

26,471
TAMPERPROOF RECLOSABLE CARTON

George L. Meyers, Menasha, Wis., assignor to American Can Company, New York, N.Y., a corporation of New Jersey Original No. 3,191,848, dated June 29, 1965, Ser. No. 347,654, Feb. 25, 1964, which is a continuation-in-part of Ser. No. 208,203, July 9, 1962. Application for reissue June 27, 1967, Ser. No. 651,640
11 Claims. (Cl. 229—51)

Matter enclosed in heavy brackets [ ] appears in the original patent but forms no part of this reissue specification; matter printed in italics indicates the additions made by reissue.

*ABSTRACT OF THE DISCLOSURE*

*A blank and a carton made from the blank includes a receptacle portion and a cover portion. The cover portion includes a top panel connected to the receptacle and has a downwardly extending skirt which telescopes over the carton panels when the carton is closed. The cover skirt includes end cover panels and a front cover panel. Each of the end cover panels and the front coer panel is connected to the adjacent side and front panel of the receptacle by means of end and front opening flaps. The opening flaps are provided with suitable means such as perforation lines for separating the cover from the receptacle in order to open the carton.*

This invention relates to a tamperproof, reclosable carton which may be made from a single blank. More specifically, the invention relates to a carton having a reclosable cover for packaging of foods such as ice cream, bread and the like. This is a continuation-in-part of my copending application Serial No. 208,203, filed July 9, 1962, *now abandoned.*

It is now customary to package many products in a sealed carton which when opened has a receptacle portion, and a cover portion having downwardly extending skirt portions which telescope over the carton receptacle portion when the carton is closed. Many such cartons embody an opening means which when utilized detracts from the appearance of the reclosed carton. Also some of the cartons themselves are not tamperproof but depend upon an overwrap material to provide tamperproofness. The covers on many of these cartons when opened swing free due to the resiliency of the carton material and the lack of adequate means for holding the cover down upon reclosing. From the standpoint of appearance as well as operability, it is desirable to provide a carton construction which is tamperproof and which has the opening means hidden beneath the skirt portion in the closed carton and also including means for insuring positive reclosure of the carton.

It is therefore an object of the present invention to provide a tamperproof reclosable carton produced from a single blank and which has a concealed opening means.

A further object of the present invention is to provide a tamperproof hinged cover carton which has a positive reclosure means.

Yet another object of the present invention is to provide a hinged cover carton which employs an opening means which does not substantially weaken the initial carton construction and open prematurely.

Still another object of the present invention is to provide a hinged cover carton in which the hinged cover telescopes over the receptacle portion so that none of the flaps or panels protrude from the reclosed carton.

Another object of the present invention is to provide a carton which can readily be set up, filled and sealed by automatic machinery.

Further details, advantages and objects will be apparent in the description of the drawings wherein.

Figure 6:
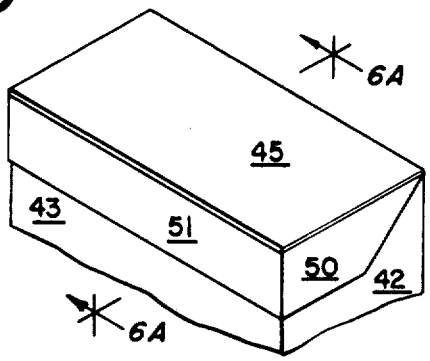
FIGURE 6 is a fragmentary perspective view of the closed and sealed carton.
Figure 6A:
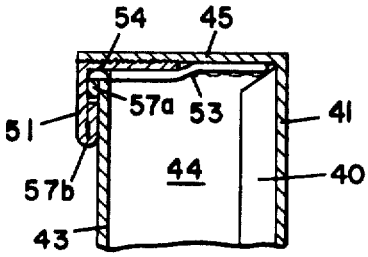
Figure 7:
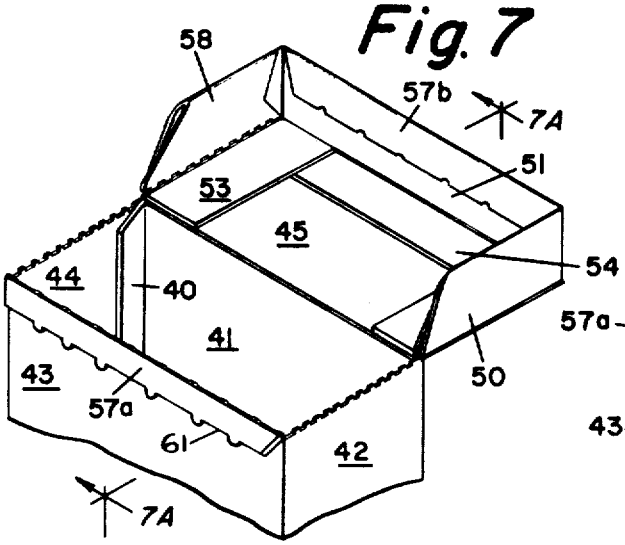
Figure 7A:
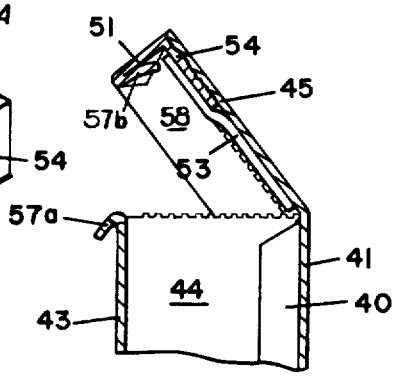
Figure 8:
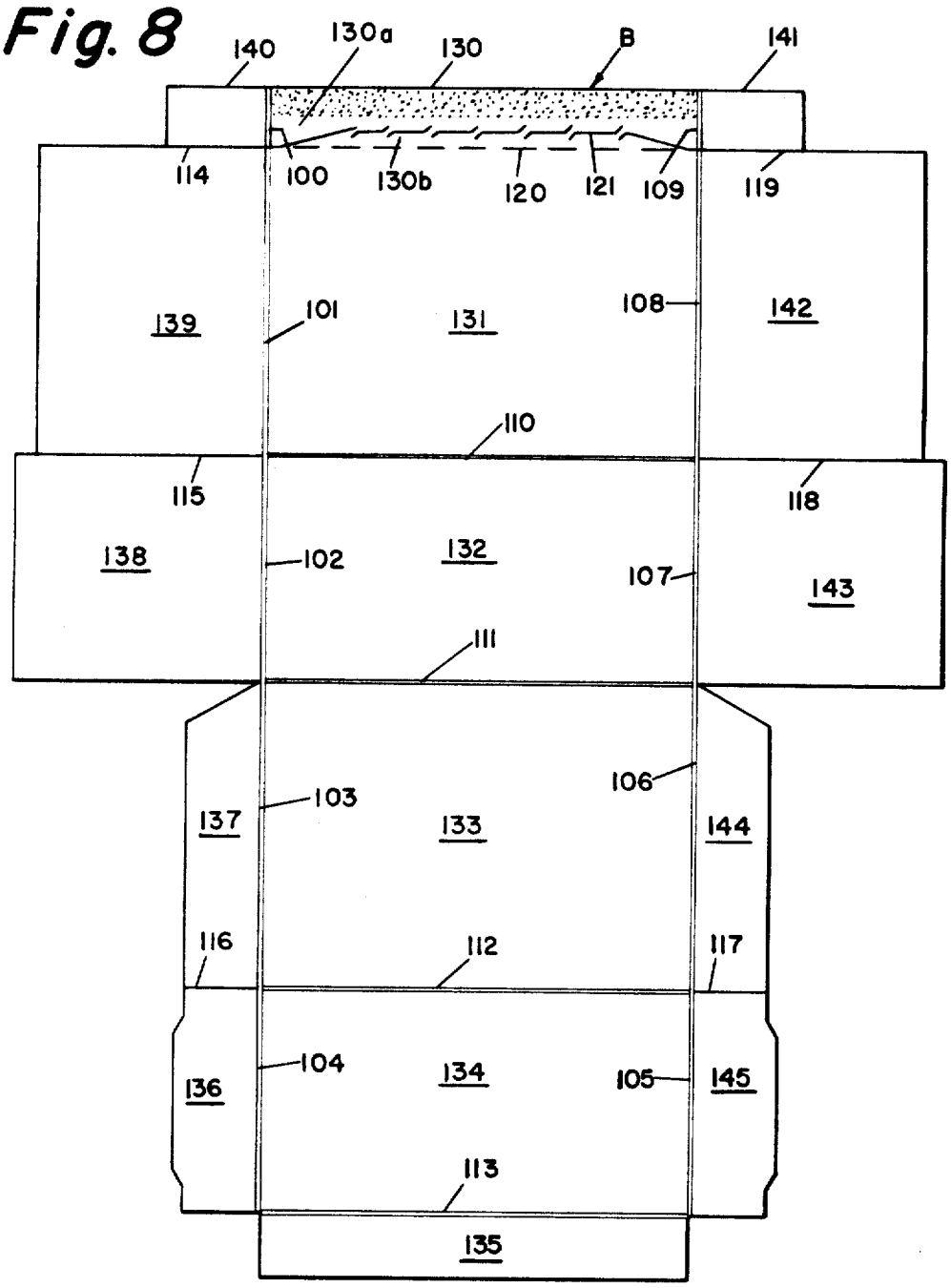
Figure 7B:
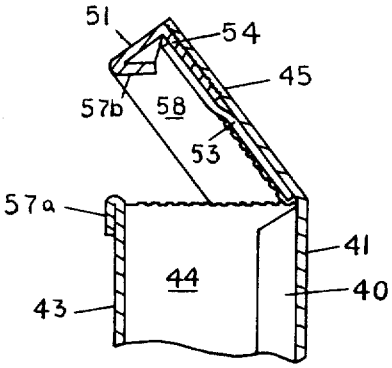

FIGURE 6A is a fragmentary sectional view of the closed and sealed carton taken along line 6A—6A of FIGURE 6, FIGURE 7 is a fragmentary perspective view of the sealed carton after it has been opened, FIGURE 7A is a fragmentary sectional view of the opened carton taken along line 7A—7A of FIGURE 7, FIGURE 7B is a fragmentary cross-sectional view of a modified of the carton shown in FIGURE 7A, FIGURE 8 is a plan view of a paperboard blank of another embodiment of the invention.

Figure 1:
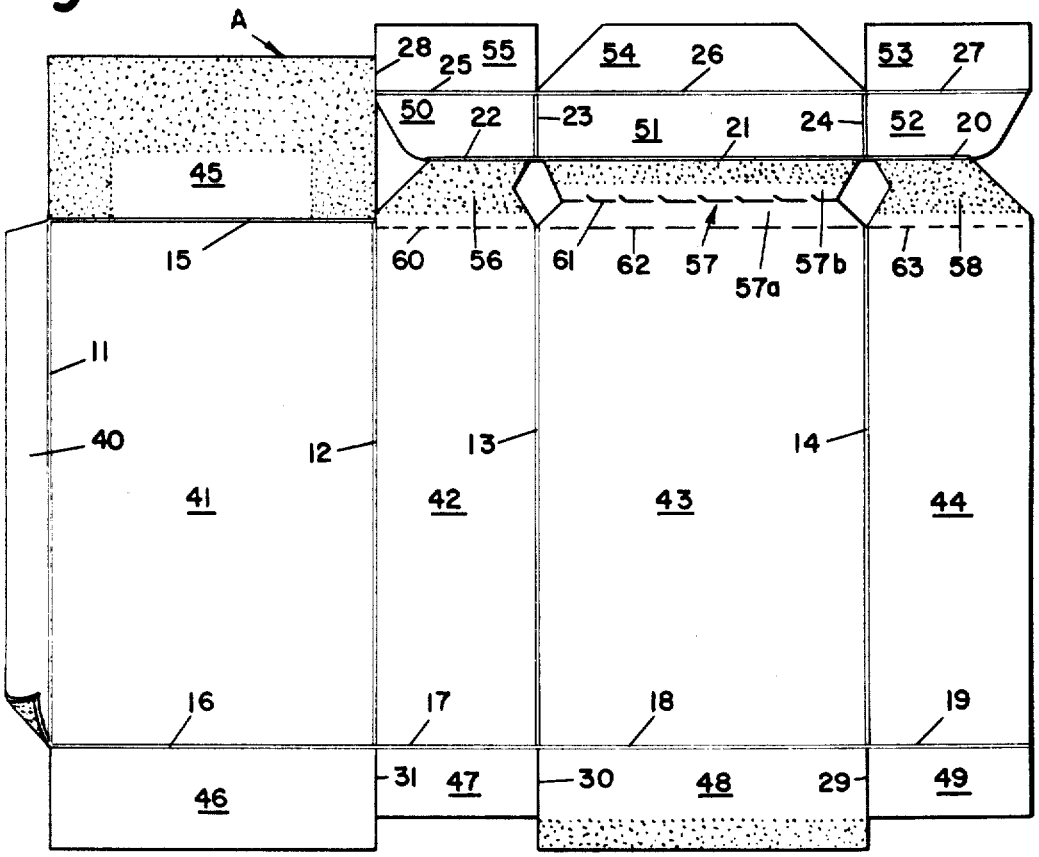
FIGURE 1 is a plan view of a paperboard blank comprising the first embodiment of this invention.
Figure 15:
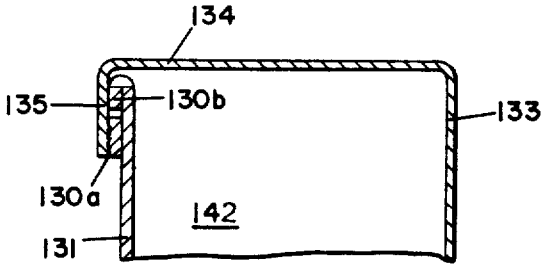
Figure 16:
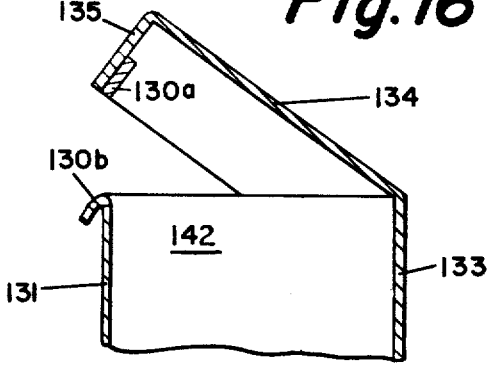
Figure 9:
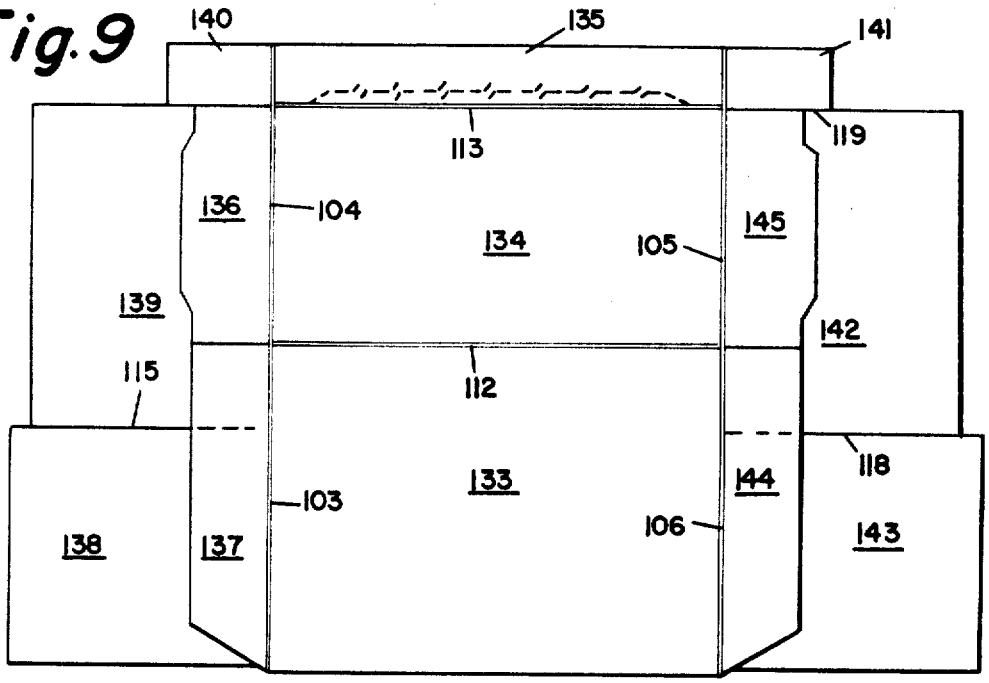
Figure 10:
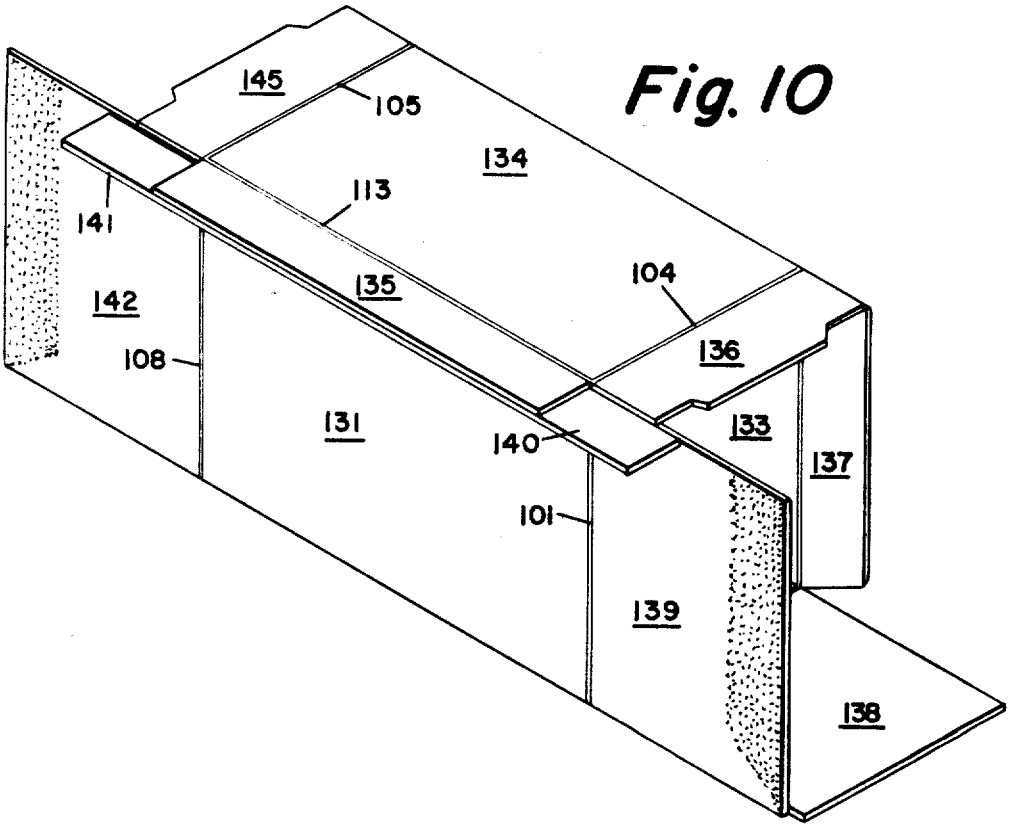
Figure 11:
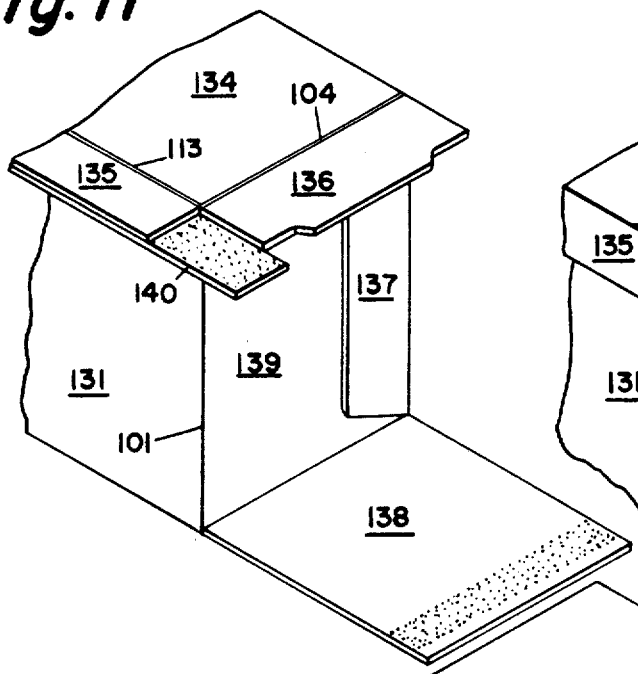
Figure 12:
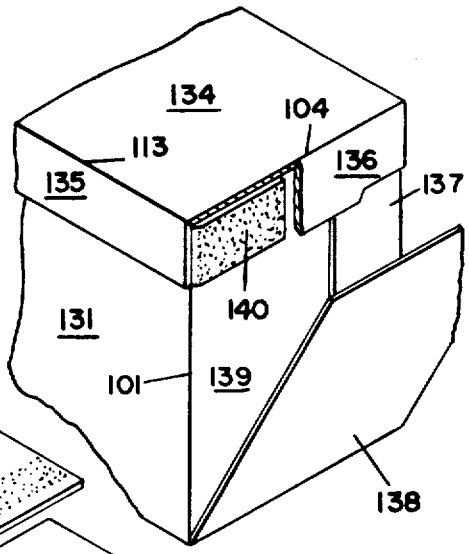
Figure 13:
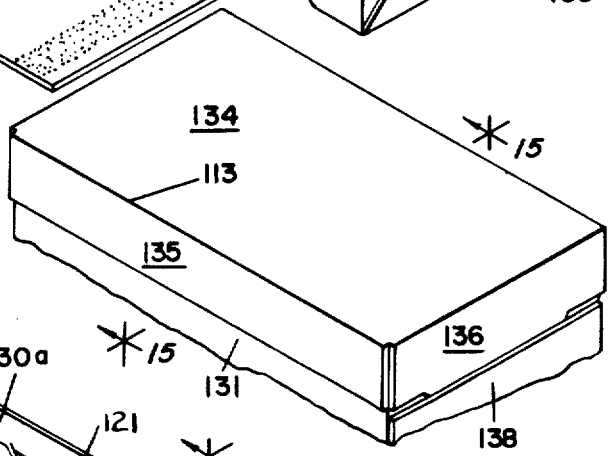
Figure 14:
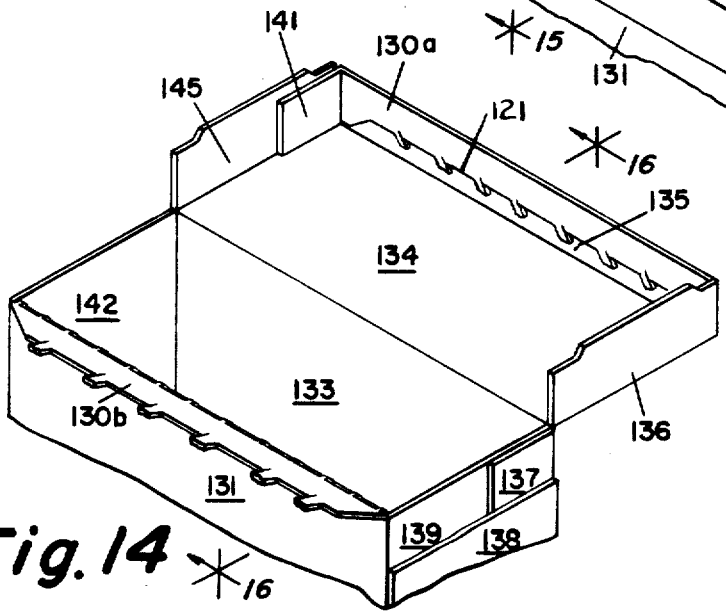
Figure 17:
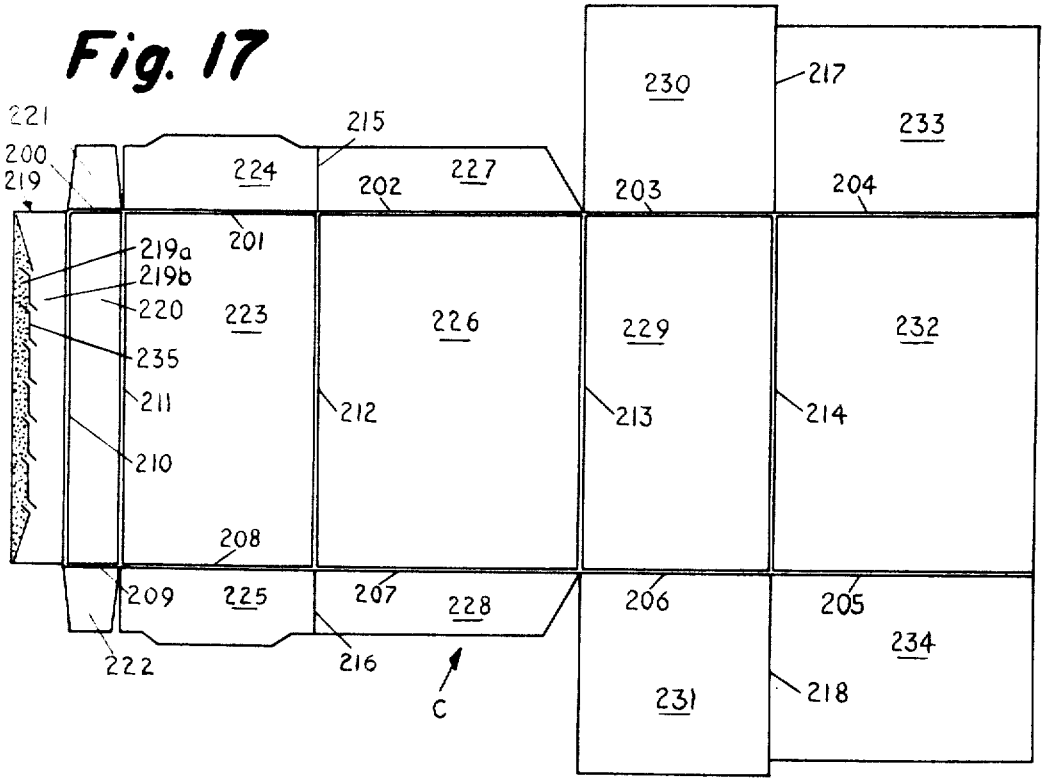
Figure 18:
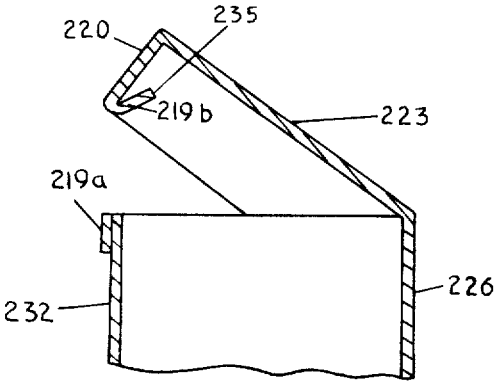
Figure 19:
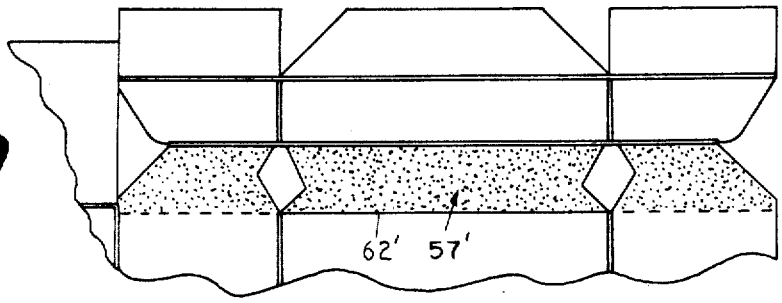
Figure 20:
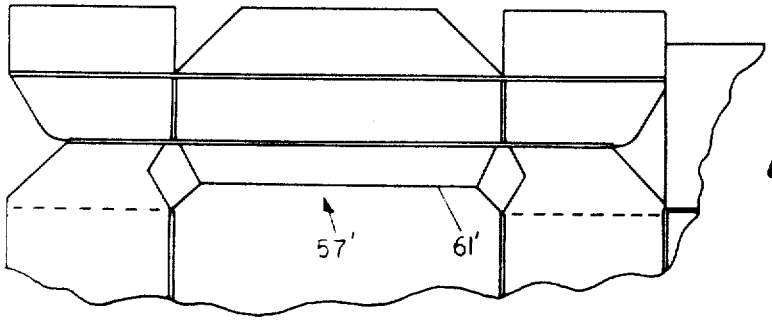
Figure 21:
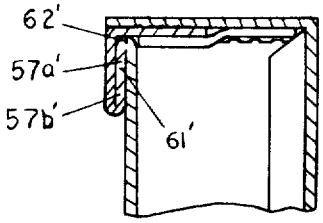
Figure 22:
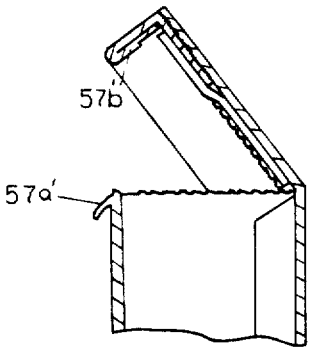

FIGURE 9 is a plan view of the blank of FIGURE 8 partially folded back upon itself and adhered to form a collapsed carton shell, FIGURE 10 is a perspective view of the squared carton partially set up, FIGURE 11 is a fragmentary perspective view of the carton at another stage in the setting up, FIGURE 12 is a fragmentary perspective view of the carton at a further stage in the setting up with one of the flaps partially cut away, FIGURE 13 is a fragmentary perspective view of the closed and sealed carton, FIGURE 14 is a fragmentary perspective view of the sealed carton after it has been opened, FIGURE 15 is a fragmentary sectional view of the closed and sealed carton taken along line 15—15 of FIGURE 13, FIGURE 16 is a fragmentary sectional view of the opened carton taken along line 16—16 of FIGURE 14, FIGURE 17 is a plan view of a paperboard blank of another embodiment of the invention, FIGURE 18 is a fragmentary sectional view of an opened carton formed from the blank shown in FIGURE 17, FIGURE 19 is a fragmentary plan view of a modification of the blank shown in FIGURE 1 comprising still another embodiment of the invention, FIGURE 20 is a fragmentary plan view of the reverse side of the blank shown in FIGURE 19, FIGURE 21 is a fragmentary sectional view of a closed and sealed carton formed from the blank shown in FIGURES 19 and 20, and FIGURE 22 is a fragmentary sectional view of the carton shown in FIGURE 21 in opened condition.

Referring to FIGURE 1, the first embodiment comprises a blank A, preferably made of paperboard. The blank is divided by score lines 11–27, and perforation lines 60–63 and cut lines 28–31 into hingedly connected panels and flaps including glue flap 40, rear panel 41, side panels 42 and 44, front panel 43, top panel 45, bottom panels 46 and 48, bottom flaps 47 and 49, end cover panels 50 and 52, front cover panel 51, end cover flaps 53 and 55, front cover flap 54, end opening flaps 56 and 58 and front opening flap 57. Front opening flap 57 is divided by perforation line 61 into a lip portion 57a and a retaining portion 57b, the function of which will be described more fully hereinafter.

Figure 2:
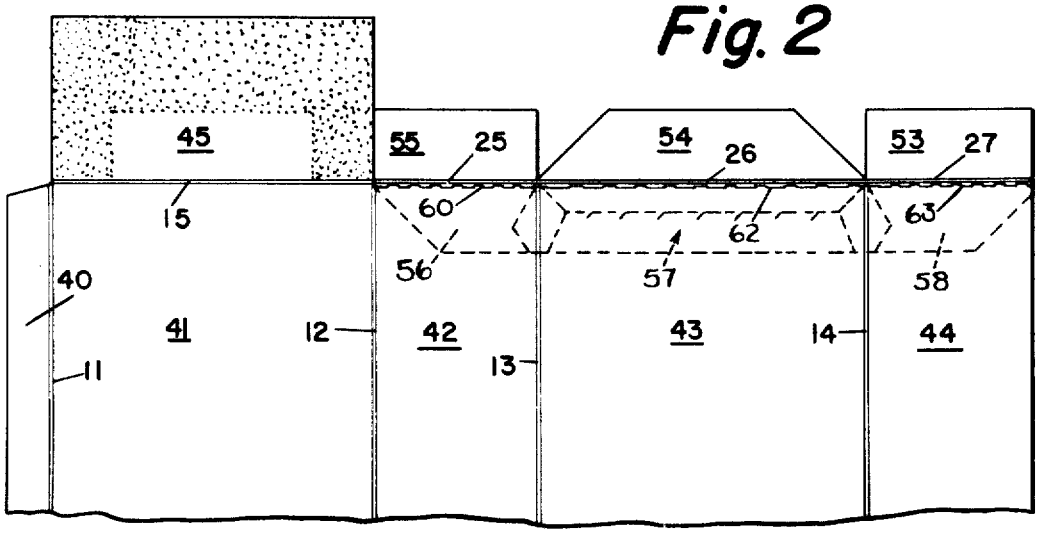
FIGURE 2 is a partial plan view of the blank of FIGURE 1 partially folded back upon itself.
Figure 3:
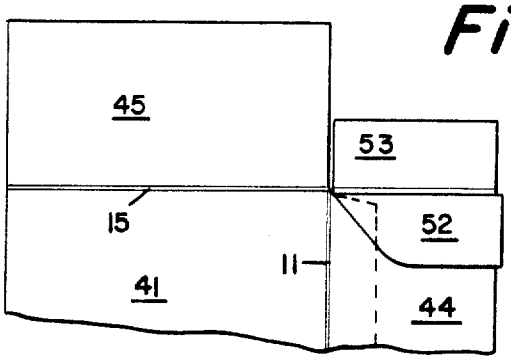
FIGURE 3 is a partial plan view of the blank folded and adhered to form a collapsed carton shell.
Figure 4:
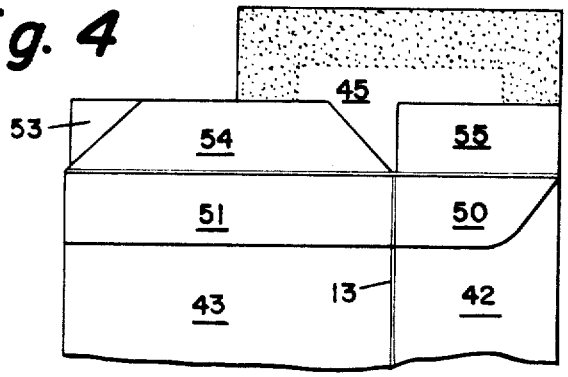
FIGURE 4 is another partial plan view of the collapsed carton shell.

The blank "A" is formed into a glued carton shell by first applying adhesive to the end opening flaps 56 and 58, front opening flap 57, and glue flap 40 in the areas indicated by stippling in FIGURE 1, folding end opening flaps 56 and 58 and front opening flap 57 with their respective attached elements, namely end cover flaps 55 and 53, and front cover flap 54 outwardly about perforation lines 60, 62 and 63 to overlie the outer surface of the side and front panels 42–44. The end cover panels 50 and 52 and front cover panel 51 are folded back upon end opening flaps 56 and 58 and front opening flap 57, respectively, along connecting score lines 20–22 and adhered thereto. The blank at this stage of folding is shown in FIGURE 2 where the edges of end opening flaps 56 and 58 and front opening flap 57 are shown in dotted outline. Next adhesive is applied to the outer surface of glue flap 40, rear panel 41 with glue flap 40 attached thereto along score line 11 is folded about score line 12 to overlie side panel 42 and front panel 43 in part, and then side panel 44 is infolded about score line 14 so that side panel 44 overlies and become adhered to the adhesive bearing surface of glue flap 40. In such condition, as shown in FIGURES 3 and 4, the shell may be shipped economically to the product packager for set-up, filling and sealing. FIGURES 3 and 4 show the opposite sides of the collapsed carton shell.

Figure 5:
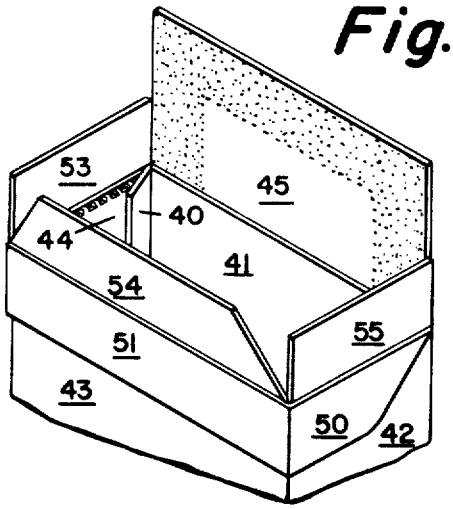
FIGURE 5 is a fragmentary perspective view of the squared carton partially set up.

FIGURE 5 depicts an initial stage in which the carton is squared and ready for filling. When the shell is squared, panels 41, 42, 43 and 44 are positioned consecutively at right angles to each other. Usually one end is closed and sealed, the carton filled and the other end closed and sealed. Since the sealing of the bottom is conventional and readily accomplished by infolding in order flaps 47, 49, and panels 46 and 48, adhering the stippled area of panel 48 shown in FIGURE 1 to the outer surface of panel 46, reference is had to closing just the top of the carton.

In closing the carton, an adhesive pattern indicated by the stippled area in FIGURES 1, 2, 4 and 5 is applied to the inner surface of top panel 45. Obviously, as an alternative, the more difficult operation of applying the adhesive to the outer surfaces of end cover flaps 53 and 55 and front cover flap 54 could be employed inasmuch as the end result in the completed carton is the same. After application of the adhesive front cover flap 54 is infolded about score line 26 and end cover flaps 53 and 55 are infolded about score lines 27 and 25 so that the flaps lie in a plane perpendicular to the panels to which they are connected. The closure is completed by infolding top panel 45 about score line 15 to overlie and become adhered to the outer surfaces of the underlying flaps.

In some instances it is advisable to use increased pressure when effecting the sealing of the top panel 45 to flaps 53, 54 and 55 to obtain a stronger bond between the adjacent carton surfaces. The collapsed shell in this case is placed over a mandrel, essentially equal in configuration to the inside of the completed carton, and flaps 53, 54, 55 infolded to lie in contact with the mandrel. The top panel 45 is then infolded and pressed tightly against the flaps. As a result of the back or reinforcement giving to the carton flaps by the mandrel, increased sealing pressure can be readily applied. The carton is then removed from the mandrel, filled and the other end is closed and sealed.

FIGURE 6 shows the closed and sealed carton, and FIGURE 6A shows a cross section of the sealed carton. The multiple thicknesses of front cover panel 51 and front opening flap 57 give increased rigidity to the cover of the carton. Since the cover of the carton is attached at all four sides to the upper edges of the main and side panels, the carton is tamperproof until detachment of the cover elements along the various lines of weakness.

Referring to FIGURES 7 and 7A, in opening the carton the cover is raised to initiate detachment of retaining portion 57b from lip portion 57a along perforation line 61. Essentially simultaneously end opening flaps 56 and 58 detach from side panels 42 and 44, respectively, along perforation lines 60 and 63. As the cover is lifted, the opening pressure is resisted by the front opening flap 57 which tends to force the lower edge of front cover panel 51 adjacent score line 21 outwardly prior to detachment of the two portions. The opened carton is shown in FIGURE 7 and FIGURE 7A shows a cross section of the opened carton with coacting portions 57a and 57b. In the open position the carton is composed of a cover portion comprising top panel 45 hinged to rear panel 41 and a hingedly connected cover skirt composed of cover panels 50–52, and a receptacle portion comprising front, rear, side and bottom panels. In reclosing the carton, the cover portion is lowered so that the appearance of the carton is essentially the same as prior to the opening. After reclosure, the adjacent edges of portions 57a and 57b abut forming a cover lock which retains the cover firmly in a closed position.

It is, of course, recognized, as shown in FIGURE 7B, that the lip portion 57a may be fixedly adhered to the outer surface of front receptacle panel 43 and retaining portion 57b left to hingedly swing about score line 21. The locking action of this form of tamperproof carton is essentially the same as that of the tamperproof carton shown in FIGURE 7A although the locking portions are reversed.

In the modified embodiment depicted in FIGURES 8–16 the shape of the flaps and panels as well as the order of folding is altered. Referring first to FIGURE 8, a blank "B" is divided by score lines 100–113, cut lines 114–119 and perforation line 120 into hingedly connected panels and flaps including opening flap 130, front panel 131, bottom panel 132, rear panel 133, top panel 134, front cover panel 135, end cover panels 136 and 145, end tabs 137 and 144, outer end flaps 138 and 143, inner end flaps 139 and 142, and glue flaps 140 and 141. Front opening flap 130 is divided by perforation line 121 into retaining portion 130a and lip portion 130b, the function of which is similar to portions 57a and 57b of the first embodiment and will be described more fully hereinafter.

The blank "B" is formed into a glued carton shell by first applying adhesive to opening flap 130, in the area indicated by stippling in FIGURE 8, folding rear panel 133 with the elements attached thereto about score line 111 to lie superposed on bottom panel 132 and adhering front cover panel 135 to the adhesive bearing surface of opening flap 130. The blank at this stage of folding is shown in FIGURE 9 as a collapsed carton shell, which may be economically shipped in such condition to the product packager for set-up, filling and sealing.

FIGURE 10 depicts an initial stage in which the carton is squared and ready for filling. When the shell is squared, panels 131, 132, 133 and 134 are positioned consecutively at right angles to each other. Usually one end is closed and sealed, the carton filled and the other end closed and sealed. Since the closing and sealing steps are the same for both ends of the carton, reference is had to closing just one end of the carton.

In closing the carton, adhesive is applied to the outer surface of inner end flap 139 in the stippled area shown in FIGURE 10 and the flap 139 is infolded about score line 101 to position it perpendicularly to bottom panel 132. Next, end tab 137 is infolded to overlie and become adhered to the adhesive bearing outer surface of inner end flap 139 as shown in FIGURE 11. Opening flap 130 and adhered front cover panel 135 are then folded down to lie parallel to front panel 131 while adhesive is applied to the outer surface of glue flap 140 and the flap infolded about score line 100 to lie superposed on inner end flap 139. Then end cover panel 136 is folded down about score line 104 to overlie portions of end tab 137 and inner end flap 139 and become adhered to glue flap 140 as shown in FIGURE 12. The closure is completed by applying adhesive to outer end flap 138 in the area indicated by the stippling in FIGURE 11 and then infolding outer end flap 138 and adhering it to end tab 137 and inner end flap 139. The closed and sealed carton is shown in FIGURE 13. In the closed and sealed carton the downwardly projecting free edge portions of end cover panels 136 and 145, respectively, are positioned in frictional contact between inner end flaps 139, 142, respectively, and outer end flaps 138, 143, respectively. FIGURE 15 shows a cross section of the closed carton illustrating the tamperproof construction of the carton. It will be noted that prior to the opening of the closed carton, the retaining portion 130a and lip portion 130b are detachably connected to each other.

Referring to FIGURES 14 and 16, in opening the carton the cover is raised to initiate detachment of retaining portion 130a from lip portion 130b along perforation line 121. As the cover is lifted, the opening pressure is resisted by the opening flap 130 which tends to force the lower edge of front cover panel 135 outwardly prior to detachment of the two portions. In the open position the carton is composed of a cover portion comprising top panel 134 hinged to rear panel 133 and a hingedly connected cover skirt composed of cover panels 135, 136 and 145 and a receptacle portion comprising front, rear and bottom panels, and end flaps. To reclose the carton, the cover portion is lowered so that the appearance of the carton is essentially the same as prior to the opening. After reclosure the adjacent edges of portions 130a and 130b abut forming a cover lock which retains the cover firmly in a closed position.

In the embodiment shown in FIGURES 17 and 18 the arrangement of the locking panels is altered.

Referring first to FIGURE 17, a blank "C" is divided by score lines 200–214, cut lines 215–218 into hingedly connected panels and flaps including front opening flap 219, front cover panel 220, glue flaps 221 and 222, top panel 223, end cover panels 224 and 225, rear panel 226, end taps 227 and 228, bottom panel 229, outer end flaps 230 and 231, front panel 232, and inner end flaps 233 and 234.

Front opening flap 219 is divided by a perforation line 235 into locking panels including retaining portion 219a and lip portion 219b, the function of which is similar to portions 57a and 57b of the first embodiment and will be described more fully hereinafter.

Blank "C" is formed into a glued carton shell by first applying adhesive to retaining portion 219a of opening flap 219 as indicated by stippling in FIGURE 17, folding bottom panel 229 with the elements attached thereto about score line 213 to lie superposed on rear panel 226, folding front cover panel 220 with the elements attached thereto about score line 211 and adhering the adhesive bearing surface, retaining portion 219a to front panel 232. The blank in this stage of formation is a collapsed carton shell. The closing and sealing of this blank is similar to blank "B."

FIGURE 18 shows the carton in opened condition. To open the carton the cover is raised to initiate detachment of lip portion 219b from retaining portion 219a along perforation line 235. As the cover is lifted, the opening pressure is resisted by the opening flap 219 which tends to force the lower edge of front cover panel 220 outwardly prior to detachment of the two portions.

In the open position the carton is composed of a cover portion comprising top panel 223 hinged to rear panel 226 and a hingedly connected cover skirt composed of cover panels 220, 221, 222, 224 and 225 and a receptacle portion comprising front, rear, bottom panels and end flaps. To reclose the carton the cover portion is lowered so that the appearance of the carton is essentially the same as prior to opening. After reclosure the adjacent edges of portions 219a and 219b abut forming a cover lock which retains the cover firmly in a closed position.

Another embodiment may be made by slightly altering any of blanks "A, B and C." An example of this embodiment, made by altering blank "A," is shown in FIGURES 19, 20, 21 and 22. As seen in FIGURES 19 and 20 to make this embodiment, instead of having a perforation line such as 62 on blank "A," a cut score lint 62' is made and instead of perforation line 61 on blank "A," a cut score line 61' is made on the reverse surface of front opening flap 57'. These cut score lines extend about half-way through the thickness of the material as best seen in FIGURE 21. Glue is applied to the entire front opening flap 57' as depicted by stippling in FIGURE 19 and then the carton is closed as previously described for blank "A." FIGURE 21 shows a cross section of the closed and sealed carton.

FIGURE 22 shows the carton in open position. To open the carton the cover is raised to sever the paperboard beginning at cut-score line 62' and continuing to cut-score line 61' to form retaining portion 57b' and lip portion 57a'. In this embodiment lip portion 57a' is comprised of only one half the board thickness and retaining portion 57b' has an abutting edge width which is also only one half of the board thickness.

While, all of the embodiments shown have the cover portion hinged to the receptacle portion at the upper edge of the rear panel, it is understood that a hinge line may be provided on the top panel so that only a portion of the top of the carton is opened. Such a hinge line may be diagonally disposed across the top panel to form a reclosable corner cover portion.

It is further understood that locking portions may be provided on the sides of the carton as well as the front or on the sides alone.

The present invention provides a carton construction using an integral blank. The carton can be readily set up, filled with the commodity to be packaged, and sealed by automatic machinery. The carton is essentially tamperproof because it cannot be opened without revealing the position of entry. There are no loose flaps to either cause inconvenience in handling and packaging or to distract from the appearance of the carton. The carton can be opened easily and upon reclosure the cover is held in place by a retaining means. Numerous openings and reclosings of the carton are not detrimental to the initial carton construction.

[It is understood that the descriptions of the carton constructions given herein are merely illustrative of the essential features of the invention, and are not limited to the specific dimensions or contours which may be greatly varied or modified and which variations are intended to be included within the scope of the appended claims.]

I claim:

[1. A tamperproof reclosable carton formed of a suitably cut and scored blank having a receptacle portion and a cover portion which telescopes over the upper edges of said receptacle portion; said receptacle portion having first and second receptacle panels; said cover portion having a top panel and first and second cover panels forming skirt portions parallel and adjacent to the respective underlying first and second receptacle panels; a first locking panel portion hingedly connected to one of said first panels, a second locking panel portion detachably connected to said first locking panel portion and being adhered to the other first panel, said first and second locking panel portions lying between and parallel to the inner surface of said first cover panel and the outer surface of said first receptacle panel.]

[2. A tamperproof reclosable carton formed of a suitably cut and scored blank having a receptacle portion and a cover portion which telescopes over the upper edges of said receptacle portion; said receptacle portion comprising hingedly connected front, rear, side and bottom receptacle panels, said cover portion comprising a top panel hingedly connected to the upper edge of said rear panel, end cover panels and a front cover panel all hingedly connected to said top panel and forming skirt portions parallel and adjacent to the respective underlying receptacle panels, a first locking panel hingedly connected to one of said front panels; a second locking panel detachably connected to said first locking panel and being adhered to the other front panel, said first and second locking panels lying between and parallel to the inner surface of said front cover panel and the outer surface of said front receptacle panel.]

[3. A tamperproof reclosable carton formed of a single suitably cut and scored blank having a receptacle portion and a cover portion which telescopes over the upper edges of said receptacle portion; said receptacle portion comprising hingedly connected front, rear, side and bottom receptacle panels; said cover portion comprising a top panel hingedly connected to the upper edge of said rear panel, end cover panels and a front cover panel all hingedly connected to said top panel and forming skirt portions parallel and adjacent to the respective underlying receptacle panels; a first locking panel hingedly connected to one of said front panels; a second locking panel detachably connected along one edge to said first locking panel and being adhered to the other front panel, said first and second locking panels lying in a common plane between and parallel to the inner surface of said front cover panel and the outer surface of said front receptacle panel.]

4. A tamperproof reclosable carton formed of a single suitably cut and scored blank having a receptacle portion and a cover portion which telescopes over the upper edges of said receptacle portion; said receptacle portion comprising hingedly connected front, rear, sides and bottom receptacle panels; said cover portion comprising a top panel hingedly connected to the upper edge of said rear panel, end cover panels and a front cover panel all hingedly connected to said top panel and forming skirt portions parallel and adjacent to the respective underlying receptacle panels; a lip element hingedly connected to the upper edge of said front receptacle panel; a retaining element detachably connected along one edge to said lip element and being attached along the opposite edge to said front cover panel, said retaining element being adhered to the inner surface of said front cover panel; said lip and retaining elements lying in a common plane between and parallel to the inner surface of said front cover panel and the outer surface of said front receptacle panel.

5. A tamperproof reclosable carton formed of a single suitably cut and scored blank having a receptacle portion and a cover portion which telescopes over the upper edges of said receptacle portion; said receptacle portion comprising hingedly connected front, rear, side and bottom receptacle panels; said cover portion comprising a top panel hingedly connected to the upper edge of said rear panel, end cover panels and a front cover panel all hingedly connected to said top panel and forming skirt portions parallel and adjacent to the respective underlying receptacle panels; a lip element hingedly connected to the upper edge of said front receptacle panel; a retaining element detachably connected along one edge to said lip element and being adhered to the inner surface of said front cover panel; said lip and retaining elements lying in a common plane between and parallel to the inner surface of said front cover panel and the outer surface of said front receptacle panel.

[6. A tamperproof reclosable carton formed of a single suitably cut and scored blank having a receptacle portion and a cover portion which telescopes over the upper edges of said receptacle portion; said receptacle portion comprising hingedly connected front, rear, side and bottom receptacle panels; said cover portion comprising a top panel hingedly connected to the upper edge of said rear panel, end cover panel and a front cover panel all hingedly connected to said top panel and forming skirt portions parallel and adjacent to the respective underlying receptacle panels; a retaining element adhered to the outer surface of said front receptacle panel; a lip element hingedly connected to the front cover panel and being detachably connected along one edge to said retaining element; said lip and retaining elements lying in a common plane between and parallel to the inner surface of said front cover panel and the outer surface of said front receptacle panel.]

7. A tamperproof reclosable carton formed of a single suitably cut and scored blank having a receptacle portion and a cover portion which telescopes over the upper edges of said receptacle portion; said receptacle portion comprising hingedly connected front, rear, bottom and a pair of side receptacle panels, said cover portion comprising a top panel hingedly connected to the upper edge of said rear panel, a front cover panel and a pair of end cover panels all hingedly connected to said top panel and forming skirt portions parallel and adjacent to the respective underlying receptacle panels; a lip element hingedly connected to the upper edge of each of said side receptacle panels, a retaining element detachably connected along one edge to each of the lip elements and being adhered to the inner surface of each of the end cover panels, said lip and retaining elements lying between and parallel to the inner surface of said end cover panels and the outer surface of said side receptacle panels.

*8. A blank for forming a carton having a tamperproof reclosable cover comprising a receptacle portion having a front panel (43), a rear panel (41), a pair of opposed side panels (42, 44), and bottom closure flaps (47, 49), panels (46, 48), and a cover portion comprising a top panel (45) connected to the receptacle rear panel (41), a pair of end cover panels (50, 52), a pair of end opening flaps (56, 58), each connected along one of its edges (60, 63) to a side panel (42, 44) and connected along another of its edges (20, 22) to an end cover panel (50, 52), a pair of end cover flaps (53, 55) for securing each of the end cover panels (50, 52) to the top panel (45) a front cover panel (51) connected to the front edge (23, 24) of each of the end cover panels, a front opening flap (57) connected along one edge (21) to the front cover panel (51) and connected along another edge (62) to the front panel (43), a front cover flap (54) for securing the front cover panel (51) to the top panel (45), and a plurality of perforation lines (60, 61, 63), each associated with one of said end (56, 58) and front opening flaps so that the front (57) and end (56, 58) opening flaps may be separated from the receptacle for opening the carton.*

*9. The blank as defined in claim 8 wherein one perforation line (61) is located intermediate the edges (62, 21) of the front opening flap (57) so that a portion (57a) of said opening flap is retained by the front panel (43) and a portion (57b) is retained by the front cover panel (51).*

*10. A tamperproof reclosable carton formed from a suitably cut and scored blank having a receptacle portion and a cover portion which telescopes over the upper edges of said receptacle portion; said receptacle portion having a bottom closure (46, 49) and front (43), rear (41), and a pair of side panels (42, 44); said cover portion having a top panel (45),* a front cover panel *(51) and a pair of end cover panels (50, 52) forming a skirt parallel and adjacent to the respective underlying front panel (43), and pair of side panels (42, 44); said front cover panel (51) connected to each end cover panel (50, 52), a front cover flap (54) and a pair of end cover flaps (53, 55) for securing the top panel (45) to the front cover panel (51) and the end cover panels (50, 52) to form the cover, a pair of end opening flaps (56, 58) each connected along one edge (20, 22) to an edge of one of the end cover panels (50, 52) and connected along another edge (60, 63) to an edge of one of the side panels (42, 44), one of each of the said end opening flap (56, 58) edge connections (20, 22, 60, 63) being a perforation*

*line, a front opening flap (57) connected along an edge (21) to the front cover panel (51) and along another edge (62) to the front panel (43) and a perforation line (61) associated with the front opening flap (57) whereby the carton may be opened.*

*11. The carton as defined in claim 10 wherein the perforation line in the front opening flap (57) is located so to separate its panel into two portions (57a and 57b) which retain the cover in locked position after the cover has been opened and reclosed.*

*12. A carton comprising a receptacle, having front (43), rear (41) and side panels (42, 44), and a cover having a top panel (45) connected to the upper edge (15) of the rear panel (41), a pair of end cover panels (50, 52) and a front cover panel (51), connected at opposed edges (23, 24) to the front edge of each end cover panel (50, 52), a pair of end cover flaps (53, 55) and a front cover flap (54) for respectively securing each of the front (51) and end (50, 52) cover panels to the top panel (45) whereby the front (51) and end (50, 52) cover panels form a skirt in telescoping relation to the upper portions of the front panel (43) and the side panels (42, 44), a pair of end opening flaps (56, 58), each end opening flap (56, 58) connected along one edge (60, 63) to a corresponding side panel (42, 44) and along another edge (20, 22) to a corresponding end cover panel (50, 52), so that each end opening flap (56, 58) lies in sandwiched relation between an end cover panel (50, 52) and a side panel (42, 44), a pair of perforation lines (60, 63) with each line being along the connecting edge between each side opening flap (56, 58) and each side panel (42, 44) so that each end cover panel (50, 52) can be separated from its adjacent side panel (42, 44), a front opening flap (57) connected along one edge (62) to the upper edge of the front panel (43) and along another edge (21) to the front cover panel (51) so that the front opening flap (57) lies in sandwiched relation between the front cover panel (51) and the front panel (43), and a perforation line (61 or 62) along the front opening flap (57) so that the cover may be opened.*

*13. An end closure for a carton having a receptacle portion closed at its lower end and including front (43) and rear (41) panels connected along their edges to side panels (42, 44); said end closure including a top panel (45) connected by a score line (15) to the top edge of the rear panel (41), first and second end cover panels (50, 52) each connected at one of their edges (23, 24) to a front cover panel (51), each of the end cover panels (50, 52) and the front cover panel (51) being connected to the top panel (45) by corresponding flaps (53, 54, 55), first and second end opening flaps (56, 58) lying in sandwiched relation between the first and second end cover panels (50, 52) and the side panels (42, 44), said first and second end opening flaps (56, 58) being connected at their lower edges (20, 22) to the lower edge of the first and second end cover panels (50, 52) and being connected at their upper edges (60, 63) to the side panels by perforation lines (69, 63), a front opening flap (57) lying in sandwiched relation between the front cover panel (51) and the receptacle front panel (43), said front opening flap (57) being connected at its lower edge (21) to the lower edge of the front cover panel (51) and at its upper edge (62) to the front panel (43), and a perforation line (61 or 62), so that the front cover panel (51) and the front panel (43) may be separated at the front opening flap.*

*14. The carton as defined in claim 12 wherein one perforation line (61) is located intermediate the edges (62, 21) of the front opening flap (57) so that a portion (57a) of said opening flap is retained by the front panel (43) and a portion (57b) is retained by a front cover panel (51).*

*15. The end closure as defined in claim 13 wherein one perforation line (61) is located intermediate the edges (61, 21) of the front opening flap (57) so that a portion (57a) of said opening flap is retained by the front panel (43) and a portion (57b) is retained by the front cover panel (51).*

References Cited

The following references, cited by the Examiner, are of record in the patented file of this patent or the original patent.

UNITED STATES PATENTS

| | | | |
|---|---|---|---|
| 1,130,271 | 3/1915 | Hammond | 229—45 |
| 1,992,222 | 2/1935 | La Grua | 229—51 |
| 2,181,837 | 11/1939 | Snyder et al. | 229—51 |
| 2,246,484 | 6/1941 | Frieders | 229—51 |
| 2,361,597 | 10/1944 | Buttery | 229—51 |
| 2,396,310 | 3/1946 | Yungblut | 229—51 |
| 2,557,914 | 6/1951 | Miller | 229—51 |
| 3,125,280 | 3/1964 | Henry | 229—51 |
| 3,295,742 | 1/1967 | Coe | 229—51 |
| Re. 26,185 | 4/1967 | Henry | 229—51 |

DAVIS T. MOOREHEAD, *Primary Examiner.*